US008480921B2

(12) United States Patent
Han

(10) Patent No.: US 8,480,921 B2
(45) Date of Patent: Jul. 9, 2013

(54) METHOD FOR DECREASING HARDNESS OF WATER

(76) Inventor: Aisam Han, Seoul (KR)

( * ) Notice: Subject to any disclaimer, the term of this patent is extended or adjusted under 35 U.S.C. 154(b) by 0 days.

(21) Appl. No.: 13/201,455

(22) PCT Filed: Feb. 3, 2010

(86) PCT No.: PCT/KR2010/000664
§ 371 (c)(1),
(2), (4) Date: Aug. 13, 2011

(87) PCT Pub. No.: WO2010/095825
PCT Pub. Date: Aug. 26, 2010

(65) Prior Publication Data
US 2011/0297874 A1 Dec. 8, 2011

(30) Foreign Application Priority Data

Feb. 18, 2009 (KR) ........................ 10-2009-0013190

(51) Int. Cl.
*C02F 5/00* (2006.01)
*C02F 5/08* (2006.01)

(52) U.S. Cl.
USPC .................... 252/175; 423/328.1; 423/335

(58) Field of Classification Search
USPC ......................................................... 252/175
See application file for complete search history.

(56) References Cited

U.S. PATENT DOCUMENTS 5,880,060 A * 3/1999 Blake et al. .................. 502/411

FOREIGN PATENT DOCUMENTS

| JP | 2003-001294 | 1/2003 |
| KR | 10-2003-0027670 | 4/2003 |
| KR | 10-2003-0043705 | 6/2003 |
| KR | 10-2004-0027228 | 4/2004 |

OTHER PUBLICATIONS

The Merck Index, 12$^{th}$ Ed., 1996, p. 1460.*
Merck, "Chemical Reagents 2002", p. 867, (2002).*
Morey et al. "The Solubility of Amorphous Silica at 25 C", Journal of Geophysical Research, 1964, vol. 69, No. 10, pp. 1995-2002.*
International Search Report for PCT/KR2010/000664 Mailed Sep. 30, 2010.

* cited by examiner

*Primary Examiner* — Peter F Godenschwager
(74) *Attorney, Agent, or Firm* — Christopher Paul Mitchell

(57) ABSTRACT

The present invention relates to a composition for decreasing the hardness of water, which includes water soluble silica. The composition for decreasing the hardness of water of the present invention can decrease the hardness of hard water to a level capable of drinking on a simple and small scale level in an area without a large scale water-purifying facility.

1 Claim, No Drawings

METHOD FOR DECREASING HARDNESS OF WATER

RELATED APPLICATIONS

This application is a 371 application of International Application No. PCT/KR2010/000664, filed Feb. 3, 2010, which in turn claims priority from Korean Patent Application No. 10-2009-0013190, filed Feb. 18, 2009, each of which is incorporated herein by reference in its entirety.

TECHNICAL FIELD

The present invention relates to a composition for decreasing the hardness of water which makes it possible to decrease the hardness of raw water, which is not drinkable because its hardness is too high, whereby to use the same as drinkable water, and in particular to a composition for decreasing the hardness of water which might be applied to a home water purifier with a relatively small capacity.

BACKGROUND ART

In a water treatment field, water is classified into a high quality water, a middle quality water and a low quality water. The high quality water presents water usable for drinking or washing, the middle quality water represents water once used and treated for reuse, and the low quality water represents polluted water after use.

The present invention is directed to a composition for decreasing the hardness of water which makes it possible to change raw water having a high hardness to be used for high quality water to drinkable water with an appropriate hardness.

Diverse methods such as a physical treatment, a chemical treatment and a biological treatment are used to decrease the hardness of raw water, and a purification agent is mainly used to help such treatments.

A tap water purification plant has a big scale of facilities in order to decrease the hardness of raw water. The tap water purification plant comprises a flocculating pond for flocculating micro suspension substances, a sedimentation pond for settling the flocculated substance, and a filtering pond for filtering the settled substance via a filtering function. The water purification plant is equipped with a large scale of facilities which are capable of continuously producing a lot of high quality water for 24 hours.

In Korea, multiple water treatment agents are designated. There are seven kinds of flocculation agents such as poly aluminum chloride, aluminum sulfate, etc., and there are five kinds of sterilization disinfection agents such as liquid chlorine, etc., and there are seven kinds of other agents such as active carbon, zeolite, illite, etc., and there is one kinds of rust inhibitor. Twenty kinds of agents are totally designated. The flocculation agent serves to flocculate micro particles suspending and floating in water, and colloid particles to bigger sizes, and settle and separate the same. The illite has an adsorption performance and is generally used as a turbid substance removing agent.

The raw water for tap water which uses natural water as a raw ware contains a lot of mineral components such as Mg, Ca, Fe, etc. The water containing lots of calcium salt and magnesium salt is called hard water, and the water containing less calcium salt and magnesium salt is called soft water. The magnesium and calcium ions in water are from sulfate, hydrogen carbonate, and hydrochloride.

What exists as hydrogen carbonate is needed to boiled and settled, thus being softened, which is called temporal hard water. Since what exists as sulfate is not settled even though it is boiled, it is called permanent hard water. The permanent hard water might be softened when it is treated with ion exchange resins.

The value obtained by changing the number of mg of Mg and Ca contained in 1 l of water into the amount of $CaCO_3$ is called hardness, and the water with higher than 200 hardness is called hard water, and the water with less than 100 is called soft water.

When the hardness of water is higher, it tastes bitters, and when drinking such water, it tastes hard. It is known that the easiness of drinking water is largely affected by the hardness of water, so the hardness is a key factor in evaluating the quality of drinkable water.

Various countries have standards on the allowable hardness on drinkable water. The recommended standard by WHO is less than 500, and in Korean, it is less than 300.

"Tasty water study club" under the health and welfare ministry of Japan suggests, as the conditions of water, nine items of the hardness of 10~100 mg/l, and isolation oxygen of 3~30 mg/l, and the presence of $SiO_2$.

The hardness of water is in proportion to the contents of calcium and magnesium ions which are bivalent positive ions in water, and silicic acid serves to make water tasty. As components which worsen the tastes of water, sulfuric acid ions, hydrochloric acid ions and magnesium ions are known as worsening the tastes of water.

The calcium ions and magnesium ions in raw water are mainly from $CaSO_4$ or $MgSO_4$, $CaCl_2$ or $MgCl_2$ and $CaHCO_3$ or $MgHCO_3$.

The hardness of raw water is different from its origin. The hardness of raw water is generally in a range of 80~500. An appropriate range of hardness for drinkable water is 60~100. In particular, the raw water produced from a limestone area exceeds the hardness of 500.

The Korean patent registration publication number 10-0330255 disclose a composition of inorganic flocculation agent for water treatment which is prepared by plastic-forming and grinding the mixture of barley stone power, coal fly ash, desulfurized gypsum and zeolite.

The above composition is used for a flocculation of micro floating substances. Since the composition contains harmful components to human such as desulfurized gypsum and coal fly ash, it is not good as a drinkable water treatment agent.

The Korean patent registration publication number 10-0484561 discloses a composition of water treatment for deodorization and heavy metals which is made by forming zeolite, loess, illite and titanium dioxide in the form of granule. The above composition is however not proper as a water treatment agent for decreasing the hardness of raw water.

There is provided a method which removes calcium and magnesium components from hard water by treating the hard water with an ion exchange resin. When the hard water is treated with an ion exchange resin, and the Ca and Mg ions are exchanged with Na ion, most of hard components might be removed from raw water.

When hard water components are all removed from raw water, the mineral components good for human are also removed, so water taste is worsened and becomes like distilled water, which is not proper as a drinkable water. In this case, it is needed to add mineral components for using such water as drinkable water.

A human body requires diverse mineral components. When such mineral components lack, diseases might take place even though only a small amount lacks. Small amount of essential minerals are contained in foods and drinkable water and are supplied to human bodies.

Calcium and magnesium are kinds of essential minerals, and calcium serves to form bone and teeth and helps coagulate blood. When calcium lacks, osteoporosis and coagulation delay problems occur. Magnesium is known to produce adenosine triphosphate which is a key metabolism substance to human. When the hardness of raw water is too high, it tastes bitters, so it does not good for drinkable water. When the hardness of raw water is too low, water tastes hard, and the supply of mineral components useful to human bodies stops, so it is needed to maintain a proper level of hardness for drinkable water. When natural water with a high hardness is supposed to be changed to soft water for the use as drinkable water, it is needed to maintain an appropriate level of hardness for the use as drinkable water, with calcium and magnesium not exceeding the hardness 100. An appropriate water purification, if any, meeting the above standards will be usefully applied in water purification field.

DISCLOSURE OF INVENTION

Accordingly, it is an object of the present invention to provide a composition for decreasing the hardness of water which makes it possible to decrease the hardness of water, which is not proper as drinkable water because hardness is too high, to be proper for the use of drinkable water.

The inventors of the claimed invention have found that soluble silica easily reacts with calcium and magnesium ions, which are the components of hardness in raw water, thus forming $3CaO, SiO_2$ and $2MgOSiO_2$, and the components of hardness can be easily eliminated by using soluble silica, this inventing the claimed invention.

ADVANTAGEOUS EFFECTS

The composition for decreasing the hardness of water according to the present invention serves to decrease the hardness of raw water, which will be used as a high quality water, to a level of drinkable water based on a small size facility in a region where a large scale of facilities is not equipped.

MODES FOR CARRYING OUT THE INVENTION

The hardness of raw water to be used a high quality water has difference depending on the regions, but has generally a range of 80~180. The raw water produced in a limestone region has higher than 500. It is needed to decrease the hardness to a range of 60~100, which is an appropriate level for drinkable water, in order to use water having a high hardness as a drinkable water. The present invention is directed to a composition for deceasing the hardness of water which makes it possible to decrease the hardness of raw water by using soluble silica. The examples of the present invention will be described in details.

Example 1

The hardness decrease performance test was conducted using raw water of high quality collected at a water purification pond located at Eosangchun-myun, Danyang-gun, Chungbuk, Korea. The compositions of the raw water of high quality are as follows.
Hardness: 163.9
Calcium concentration: 49.5 ppm
Magnesium concentration: 9.8 ppm
$SO_4^{-2}$ concentration: not detected Hardness=49.5 (calcium concentration)×2.5+9.8 (magnesium concentration)×4.1

10 l of raw water of high quality was injected into a drinkable water glass container of a volume of 18 l, and cotton pack with 20 g of soluble silica powder was inputted therein and was placed for two hours, and the hardness was measured. A result was shown in Table 1. When the cotton pack was placed in water and was placed for 10 minutes, micro particle sediments were formed, and sediments were settled on the bottom of the container. When the sediments were filtered and removed, it was obtain drinkable water. The high quality of water was heated and coiled at 100° C., so the change in hardness was small. It was confirmed, after analysis, that the white micro particle sediments were a mixture of calcium silicate and magnesium silicate.

The soluble silica according to the present invention was obtained from a silica mine and was ground to make the grain sizes of 300~400 meshes in powder forms, and the illite was obtained from an illite mine from which water was removed, and the illite was ground to the grain sizes of 100~200 meshes.

$SiO_2$ obtained from nature resides in various forms depending on the structure of crystal, and is insoluble in almost silica water. $3SiO_2.H_2O$ has a low solubility, but is soluble in water by a small amount. The soluble silica used in the present invention was obtained from silica mine located in Hyengsung-gun, Gangwon-do, Korea. The soluble silica is used as a conventional silica mineral. The solubility of soluble silica in water is 0.15 g/l (20° C.).

TABLE 1

| Classification | Silica treated | Heating treated |
| --- | --- | --- |
| Hardness of high quality water | 163.9 | 145 |
| Residual hardness after treatment | 79.75 | 105 |
| Decreased hardness | 84.15 | 40 |
| Hardness decrease ratio (%) | 51.39 | 27.6 |

It is estimated that the decreases of the concentrations of the calcium and magnesium ions, which are hardness components in raw water, are due to the reactions based on the following reaction formula with soluble silicic acid.

$$SiO_2.H_2O+H_2O \rightarrow SiO_4^{-4}+H^+$$

$$Ca^{+2}+SiO_2^{-4}+H_2O \rightarrow 3CaO.SiO_2 \text{ (calcium silicate)}$$

$$Mg^{+2}+SiO_2^{-4}+H_2O \rightarrow 2MgOSiO_2 \text{ (magnesium silicate)}$$

Since calcium silicate and magnesium silicate are insoluble in water, it is possible to separate them by precipitation.

Example 2

The hardness decrease performance tests were conducted using high quality raw water collected at the water purification pond located at Bukmyeon, Youngyeol-gun, Gangwon-do, Korea. The compositions of the raw water are as follows.
Hardness: 187.13
Calcium concentration: 55.5 ppm
Magnesium concentration: 11.8 ppm
Sulfuric acid ion ($SO_4^{-2}$) concentration: 152 ppm
The cotton pack with 41 g of a hardness decrease composition formed of 20 g of silica powder, 1.0 g of sodium carbonate and 20 g of illite was prepared. In the compositions, there were 48.8 wt % of silica, 2.4 wt % of sodium carbonate and 48.8 wt % of illite. 10 l of high quality raw water was injected into 18 l of a drinkable water glass container, and the cotton pack was inputted and placed for 2 hours, and the hardness change was measured. A result of the measurement is shown in Table 2. The high quality water was heated and boiled at 100° C. As a result, the hardness change was relatively small.

When Ca ion resides in water in the form of $CaHCO_3$, namely, in case of temporal hard water, it reacts with soluble silica, thus settling calcium silicate. When Ca ion resides in the form of $CaSO_4$, namely, in case of permanent hard water, the reactivity with soluble silica is very low. In this case, $Na_2CO_3$ is added to change $CaSO_4$ to $CaHCO_3$, and then a reaction with soluble silica is conducted.

Illite is generally used as a water treatment agent. The illite has a high adsorption performance, thus efficiently adhering and removing micro floating substances and underwater microorganisms.

Since high quality raw water is obtained from nature, it is needed to remove micro floating substances and underwater microorganism.

TABLE 2

| Classification | Hardness decrease composition treated | Heating treated |
|---|---|---|
| Hardness of high quality water | 187.13 | 187.13 |
| Residual hardness after treatment | 93.04 | 136 |
| Decreased hardness | 94.09 | 51.13 |
| Hardness decrease ratio (%) | 50.3 | 27.33 |

The contents of Ca after treatment was 23.5 ppm, and the contents of Mg was 4.42 ppm.

Example 3

The tests were performed using the high quality raw water collected from the water collection pond used in the example 2.

The cotton pack with a hardness decrease composition formed of 22 g of soluble silica, 1.2 g of sodium carbonate and 20 g of illite was prepared. In the compositions, there were 51 wt % of soluble silica, 2.8 wt % of sodium carbonate and 46.2 wt % of illite. 10 l of high quality raw water was injected into 18 l of a drinkable water glass container, and the cotton pack was inputted and placed for 2 hours, and the hardness change was measured. A result of the measurement is shown in Table 3. The high quality water was heated and boiled at 100° C. As a result, the hardness change was relatively small.

TABLE 3

| Classification | Water treatment agent treated | Heating treated |
|---|---|---|
| Hardness of high quality water | 120 | 120 |
| Residual hardness after treatment | 57 | 103 |
| Decreased hardness | 63 | 17 |
| Hardness decrease ratio (%) | 52.5 | 14.2 |

The raw water with a hardness range of 120~200 is characterized in that calcium ion concentration is in a range of 30~60 ppm, and magnesium ion concentration is in a range of 10~15 ppm, and the solubility of aqueous silica with respect to water is less than 0.15 g/l, so it is possible to decrease the hardness of water to the level of 60~100 by maintaining Silica ion ($SiO_4^{-4}$) 30~120 ppm in water.

It is needed to maintain the concentration of $SiO_4^{-4}$ at 30~120 ppm in order to decrease the calcium ion concentration and magnesium ion concentration in water.

In the composition for decreasing the hardness of water according to the present invention formed of soluble silica powder, sodium carbonate and illite, the composition ratio of silica powder and sodium carbonate is determined depending on the hardness of raw water and the contents of sulfate. It is preferred that it has the same weight % as aqueous silica powder and illite.

It is needed to maintain, per 10 l of water, 18~22 g of silica powder, 1~1.2 g of sodium carbonate, and 18~22 g of illite in order to maintain the raw water, which is in a range of hardness of 120~200 and sulfuric acid ion concentration of 100~200 ppm, to the hardness of 60~100. In the compositions, there are 44~54 wt % of soluble silica, 2.0~3.0 wt % of sodium carbonate, and 44~54 wt % of illite.

The invention claimed is:

1. A method for decreasing the hardness of water, comprising:
    adding a composition into the water, wherein the composition consists of:
    44 to 54 wt. % of soluble silica powder;
    2.0 to 3.0 wt. % of sodium carbonate; and
    44 to 54 wt. % of illite.

* * * * *